United States Patent
Yuzawa et al.

(10) Patent No.: US 10,731,898 B2
(45) Date of Patent: Aug. 4, 2020

(54) BINARY REFRIGERATING APPARATUS

(71) Applicant: PHC HOLDINGS CORPORATION, Tokyo (JP)

(72) Inventors: Jiro Yuzawa, Toon (JP); Takashi Toyooka, Toon (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 123 days.

(21) Appl. No.: 15/941,850

(22) Filed: Mar. 30, 2018

(65) Prior Publication Data

US 2018/0224166 A1 Aug. 9, 2018

Related U.S. Application Data

(63) Continuation of application No. 14/868,384, filed on Sep. 28, 2015, now abandoned, which is a (Continued)

(30) Foreign Application Priority Data

Mar. 29, 2013 (JP) ................. 2013-072796

(51) Int. Cl.
  *F25B 7/00* (2006.01)
  *C09K 5/04* (2006.01)
  *F25B 9/00* (2006.01)

(52) U.S. Cl.
  CPC ............... *F25B 7/00* (2013.01); *C09K 5/045* (2013.01); *F25B 9/006* (2013.01); (Continued)

(58) Field of Classification Search
  CPC ...... F25B 7/00; F25B 9/006; C09K 2205/106; C09K 2205/22; C09K 2205/34; C09K 2205/126
  See application file for complete search history.

(56) References Cited

U.S. PATENT DOCUMENTS 6,467,279 B1 10/2002 Backman et al.
2004/0123608 A1 7/2004 Kamimura et al.
(Continued)

FOREIGN PATENT DOCUMENTS

EP    1491608 B1    1/2009
JP    H05-287263 A    11/1993
(Continued)

OTHER PUBLICATIONS

Miklashevich et al., Refrigerant, May 7, 1989, SU1477733A1, Whole Document (Year: 1989).*
(Continued)

*Primary Examiner* — Larry L Furdge
(74) *Attorney, Agent, or Firm* — McDermott Will & Emery LLP

(57) ABSTRACT

A binary refrigerating apparatus employs a refrigerant composition that has a small global-warming potential (GWP) and can be used as a refrigerant capable of achieving a low temperature of −80° C. A refrigerant composition used as a low-temperature-side refrigerant is a refrigerant mixture including a non-azeotropic mixture in which 20% by mass or less of carbon dioxide (R744) is mixed to difluoroethylene (R1132a). A refrigerant composition used as a high-temperature-side refrigerant is a combination of: a non-azeotropic mixture comprising the refrigerant group of difluoromethane (R32), pentafluoroethane (R125), 1,1,1,2-tetrafluoroethane (R134a) and 1,1,3-trifluoro ethane (R143a); and 1,1,1,2,3-pentafluoropentene (HFO-1234ze), having a global-warming potential (GWP) of 1500 or less.

15 Claims, 1 Drawing Sheet

Related U.S. Application Data continuation of application No. PCT/JP2014/001839, filed on Mar. 28, 2014.

(52) U.S. Cl.
CPC .. *C09K 2205/106* (2013.01); *C09K 2205/126* (2013.01); *C09K 2205/22* (2013.01); *C09K 2205/34* (2013.01)

(56) References Cited

U.S. PATENT DOCUMENTS

| | | |
|---|---|---|
| 2010/0326095 A1 | 12/2010 | Van Horn et al. |
| 2011/0072836 A1 | 3/2011 | Wang et al. |
| 2014/0077122 A1 | 3/2014 | Fukushima |
| 2014/0083124 A1 | 3/2014 | Sugimoto et al. |
| 2014/0194544 A1 | 7/2014 | Bowman et al. |

FOREIGN PATENT DOCUMENTS

| | | |
|---|---|---|
| JP | 2003-062419 A | 3/2003 |
| JP | 2005-015633 | 1/2005 |
| JP | 4085897 B2 | 5/2008 |
| JP | 5009530 B2 | 8/2012 |
| JP | 2012-251170 A | 12/2012 |
| JP | 2013-049859 A | 3/2013 |
| SU | 1477733 A1 * | 5/1989 |
| WO | 2012157763 A1 | 11/2012 |
| WO | 2013018148 A1 | 2/2013 |

OTHER PUBLICATIONS

International Preliminary Examination Report on Patentability dated Apr. 17, 2015, which was received in corresponding International Application No. PCT/JP2014/001839.

* cited by examiner

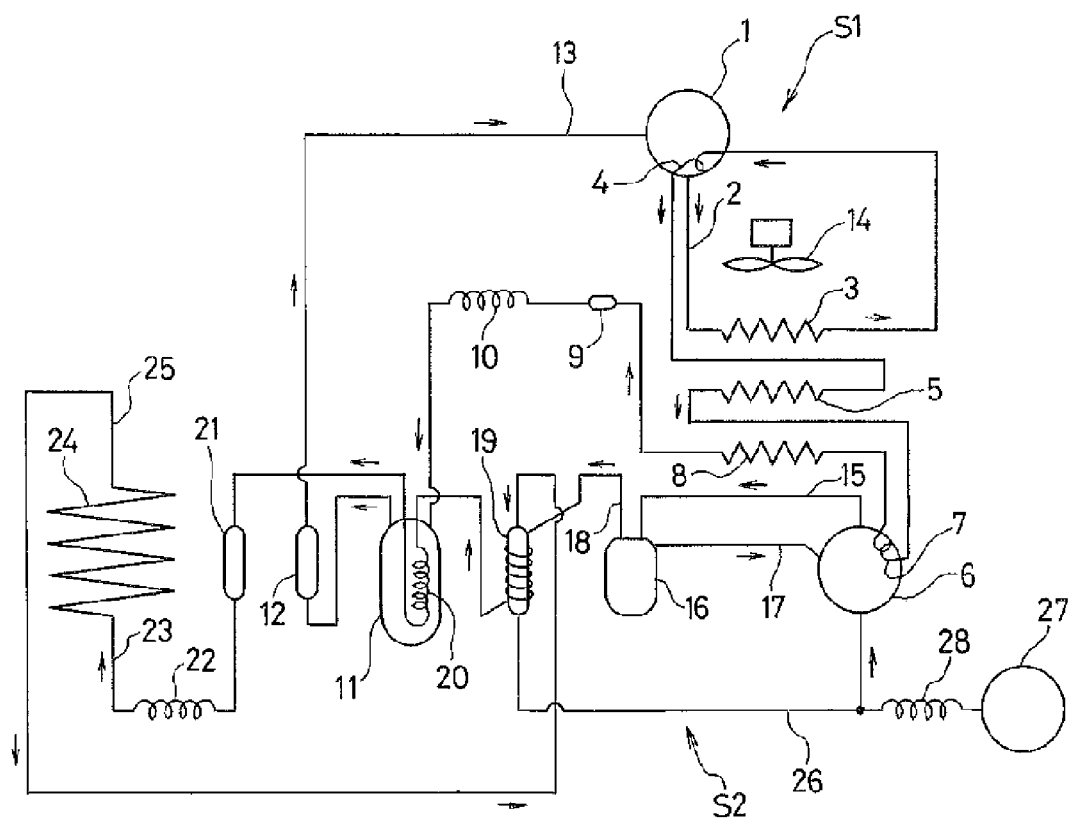

BINARY REFRIGERATING APPARATUS

This application is a continuation application of Ser. No. 14/868,384 filed Sep. 28, 2015, which is a continuation application of International Application No. PCT/JP2014/001839 filed Mar. 28, 2014, which claims priority to Japanese Patent Application No. 2013-072796 filed Mar. 29, 2013. The subject matter of each is incorporated herein by reference in entirety

TECHNICAL FIELD

The present invention relates to a binary refrigerating apparatus including a refrigerant mixture. The present invention more particularly relates to: a refrigerant composition that has a small global-warming potential (hereinafter, referred to as a GWP) to be earth friendly, can be used as a refrigerant capable of achieving a low temperature of −80° C., and is excellent in refrigerating capacity and other performance; and a binary refrigerating apparatus that includes the refrigerant composition and can actually achieve low temperature.

BACKGROUND ART

Conventionally used refrigerants for refrigerators include a non-azeotropic mixture (R407D) of difluoromethane (R32)/pentafluoroethane (R125)/1,1,1,2-tetrafluoroethane (R134a) (15/15/70% by mass) and a non-azeotropic mixture (R404A) of pentafluoroethane (R125)/1,1,1-trifluoroethane (R143a)/1,1,1,2-tetrafluoroethane (R134a) (44/52/4% by mass). The boiling point of R407D is about −39° C., and the boiling point of R404A is about −46° C., and these are suitable for known refrigerating apparatuses. Furthermore, even when a compressor inlet temperature is relatively high, an outlet temperature does not increase to a degree that oil sludge is caused in a compressor. However, R404A has a relatively high GWP of 3920.

On the other hand, for obtaining a lower temperature range of −80° C. or lower, R508A (an azeotropic mixture of trifluoromethane R23 and hexafluoroethane R116) is used. The boiling point of R508A is −85.7° C., and suitable for obtaining low temperature.

However, the above-described refrigerants each have a physical property that the global-warming potential (the GWP value) is extraordinarily high.

This refrigerant composition is either a refrigerant composition including an azeotropic mixture (R508A, boiling point: −85.7° C.) of 39% by weight of trifluoromethane (R23) having a rather high specific heat ratio and 61% by weight of hexafluoroethane (R116) having a rather low specific heat ratio, or a refrigerant composition including a mixture of this azeotropic mixture and n-pentane or propane that is mixed in a ratio of 14% or less with respect to a total weight of trifluoromethane and hexafluoroethane. This refrigerant composition can achieve a low temperature of −80° C.

However, the above-described R508A has a high GWP of 13200, which has been a problem.

Carbon dioxide (R744) has a small GWP of 1, but has a problem that oil deterioration and sludge occur due to increase in pressure and outlet temperature. Therefore, there are proposed: a refrigerant mixture in which carbohydrates such as propane, cyclopropane, isobutene, and butane are added to carbon dioxide in a ratio of about 30 to 70% of the whole; and a refrigeration cycle apparatus including the refrigerant mixture (see Patent Literature 1).

Furthermore, there are proposed: a refrigerant mixture containing isobutane in a ratio of 40 to 60% and trifluoromethane (R23) as the remainder (see Patent Literature 2); a refrigerant mixture in which propane is mixed in a ratio of 65% or more to a mixture of difluoromethane and pentafluoroethane (see Patent Literature 3); and the like.

CITATION LIST

Patent Literature

Patent Literature 1: Japanese Patent Application Laid-Open No. 2005-15633
Patent Literature 2: Japanese Patent No. 5009530
Patent Literature 3: Japanese Patent No. 4085897

SUMMARY OF INVENTION

Technical Problem

The above-described prior art contains carbohydrates such as propane, which are combustible, in an amount of about 30 to 70% with respect to the whole refrigerant, and thus has a risk of explosion.

An object of the present invention is to provide a binary refrigerating apparatus employing a refrigerant composition that solves the existing problems, and that has a small GWP to be earth friendly. The refrigerant composition is a refrigerant mixture that has a high COP, does not cause oil deterioration and sludge, can return an oil to a compressor using n-pentane or propane as an oil carrier, has no risk of explosion, can achieve a low temperature of −80° C., and is excellent in refrigerating capacity and other performance.

Solution to Problem

For solving the above-described problems, the inventor has conducted extensive studies, and found that the problems can be solved by using: as a refrigerant to be filled in a low-temperature-side refrigerant circuit, a mixture of a non-azeotropic mixture in which 20% by mass or less of carbon dioxide (R744) is mixed to difluoroethylene (R1132a) or a non-azeotropic mixture in which R116 is further added to achieve non-combustible composition and a predetermined amount or less of n-pentane or propane; and, as a refrigerant to be filled in a high-temperature-side refrigerant circuit, a mixture of a refrigerant mixture of R407D or an R404A alternative having a GWP of 1500 or less and a predetermined amount or less of n-pentane. Thus, the present invention has been accomplished.

An invention according to claim 1 to solve the above-described problems is a binary refrigerating apparatus including a high-temperature-side refrigeration circuit and a low-temperature-side refrigeration circuit, which achieves a refrigerating capacity of −80° C. or lower by condensing a refrigerant in the low-temperature-side refrigeration circuit with a refrigerant passing through a cascade condenser in the high-temperature-side refrigeration circuit, wherein a refrigerant composition containing difluoroethylene (R1132a) and hexafluoroethane (R116) is used as the refrigerant in the low-temperature-side refrigeration circuit, so that an evaporation temperature reaches a temperature lower than both boiling points of difluoroethylene (R1132a) and hexafluoroethane (R116).

An invention according to claim 2 is a binary refrigerating apparatus comprising a high-temperature-side refrigeration circuit and a low-temperature-side refrigeration circuit, which achieves a refrigerating capacity of −80° C. or lower by condensing a refrigerant in the low-temperature-side refrigeration circuit with a refrigerant passing through a cascade condenser in the high-temperature-side refrigeration circuit, wherein a refrigerant composition containing difluoroethylene (R1132a) and more than 0% by mass and 20% by mass or less of carbon dioxide (R744) is used as the refrigerant in the low-temperature-side refrigeration circuit, so that an evaporation temperature reaches a temperature lower than both boiling points of difluoroethylene (R1132a) and carbon dioxide (R744).

An invention according to claim 3 is the binary refrigerating apparatus according to claim 1, wherein a refrigerant composition in which carbon dioxide (R744) is further mixed is used as the refrigerant in the low-temperature-side refrigeration circuit, so that an evaporation temperature reaches a temperature lower than any boiling points of difluoroethylene (R1132a), hexafluoroethane (R116), and carbon dioxide (R744).

An invention according to claim 4 is the binary refrigerating apparatus according to claim 2, wherein hexafluoroethane (R116) is further mixed as the refrigerant in the low-temperature-side refrigeration circuit.

An invention according to claim 5 is the binary refrigerating apparatus according to claim 4, wherein a refrigerant composition in which difluoroethylene (R1132a)/hexafluoroethane (R116)/carbon dioxide (R744)=27.6 to 29.2% by mass/56.8 to 68.4% by mass/4.0 to 14.0% by mass are mixed is used as the refrigerant in the low-temperature-side refrigeration circuit.

An invention according to claim 6 is the binary refrigerating apparatus according to claim 4, wherein a refrigerant composition in which difluoroethylene (R1132a)/hexafluoroethane (R116)/carbon dioxide (R744)=54.8 to 58.3% by mass/25.2 to 35.7% by mass/8.0 to 18.0% by mass are mixed is used as the refrigerant in the low-temperature-side refrigeration circuit.

An invention according to claim 7 is the binary refrigerating apparatus according to any one of claims 1 to 6, wherein a refrigerant composition in which n-pentane is mixed in a ratio of 14% by mass or less with respect to the total mass of the refrigerant composition in the low-temperature-side refrigeration circuit is used.

An invention according to claim 8 is the binary refrigerating apparatus according to any one of claims 1 to 6, wherein a refrigerant composition in which propane (R290) is mixed in a ratio of 14% by mass or less with respect to the total mass of the refrigerant composition in the low-temperature-side refrigeration circuit is used.

An invention according to claim 9 is the binary refrigerating apparatus according to any one of claims 1 to 8, wherein a refrigerant composition, containing a non-azeotropic mixture comprising the refrigerant group of difluoromethane (R32), pentafluoroethane (R125), 1,1,1,2-tetrafluoroethane (R134a), and 1,1,3-trifluoroethane (R143a), and 1,1,1,2,3-pentafluoropentene (HFO-1234ze), and having a Global-warming potential (GWP) of 1500 or less, is used as the refrigerant in the high-temperature-side refrigeration circuit.

An invention according to claim 10 is the binary refrigerating apparatus according to any one of claims 1 to 8, wherein a refrigerant composition, containing a non-azeotropic mixture comprising the refrigerant group of difluoromethane (R32), pentafluoroethane (R125), 1,1,1,2-tetrafluoroethane (R134a), and 1,1,3-trifluoroethane (R143a), and 1,1,1,2-tetrafluoropentene (HFO-1234yf), and having a Global-warming potential (GWP) of 1500 or less, is used as the refrigerant in the high-temperature-side refrigeration circuit.

Advantageous Effects of Invention

The invention according to claim 1 of the present invention is a binary refrigerating apparatus including a high-temperature-side refrigeration circuit and a low-temperature-side refrigeration circuit, which achieves a refrigerating capacity of −80° C. or lower by condensing a refrigerant in the low-temperature-side refrigeration circuit with a refrigerant passing through a cascade condenser in the high-temperature-side refrigeration circuit, and wherein a refrigerant composition containing difluoroethylene (R1132a) and hexafluoroethane (R116) is used as the refrigerant in the low-temperature-side refrigeration circuit. Since difluoroethylene (R1132a) has a small GWP of 10 and a low boiling point of −85.7° C., the refrigerant composition has a small GWP to be earth friendly, and can achieve a low temperature of −80° C. Therefore, a significant effect in which the COP does not decrease, oil deterioration and sludge do not occur, and a risk of explosion is not caused is exerted. Also, the addition of an appropriate amount of R116 exerts a further significant effect of solving concerns on combustibility.

Since R116 has an extraordinarily high GWP value of 12200, the added amount of R116 is preferably configured to be a minimum for achieving non-combustion, thereby suppressing the GWP value to be low while maintaining non-combustion.

The invention according to claim 2 is a binary refrigerating apparatus comprising a high-temperature-side refrigeration circuit and a low-temperature-side refrigeration circuit, which achieves a refrigerating capacity of −80° C. or lower by condensing a refrigerant in the low-temperature-side refrigeration circuit with a refrigerant passing through a cascade condenser in the high-temperature-side refrigeration circuit, wherein a refrigerant composition containing difluoroethylene (R1132a) and carbon dioxide (R744) is used as the refrigerant in the low-temperature-side refrigeration circuit. Since difluoroethylene (R1132a) has a small GWP of 10 and a low boiling point of −85.7° C., and carbon dioxide (R744) has a GWP of 1, the refrigerant composition has a small GWP to be earth friendly, and can achieve a low temperature of −80° C. Furthermore, since carbon dioxide (R744) is added, the outlet pressure and the outlet temperature are inhibited from increasing. Therefore, a further significant effect in which the COP does not decrease, oil deterioration and sludge do not occur, and a risk of explosion is not caused is exerted.

The non-azeotropic mixture in which 20% by mass or less of carbon dioxide (R744) is mixed to difluoroethylene (R1132a) is used as the low-temperature-side refrigerant. R1132a is an A2 refrigerant (combustible refrigerant), and the mixture of R1132a and R744 is still an A2L refrigerant (slightly combustible refrigerant).

To address this concern, the addition of R116 can solve concerns on combustibility.

The invention according to claim 3 of the present invention is the binary refrigerating apparatus according to claim 1, wherein the use of a refrigerant composition in which carbon dioxide (R744) is further mixed as the refrigerant in the low-temperature-side refrigeration circuit, so that an evaporation temperature reaches a temperature lower than any boiling points of difluoroethylene (R1132a), hexafluoroethane (R116), and carbon dioxide (R744). R116 can solve concerns on combustibility while the addition of an appropriate amount of carbon dioxide (R744) inhibits the outlet pressure and the outlet temperature from increasing. Therefore, a further significant effect in which the COP does not decrease, oil deterioration and sludge do not occur, and a risk of explosion is not caused is exerted.

The invention according to claim 4 is the binary refrigerating apparatus according to claim 2, wherein hexafluoroethane (R116) is further mixed as the refrigerant in the low-temperature-side refrigeration circuit. The addition of an appropriate amount of R116 can solve concerns on combustibility. Furthermore, since carbon dioxide (R744) is added, the outlet pressure and the outlet temperature are inhibited from increasing. Therefore, a further significant effect in which the COP does not decrease, oil deterioration and sludge do not occur, and a risk of explosion is not caused is exerted.

The invention according to claim 5 is the binary refrigerating apparatus according to claim 4, wherein a refrigerant composition in which difluoroethylene (R1132a)/hexafluoroethane (R116)/carbon dioxide (R744)=27.6 to 29.2% by mass/56.8 to 68.4% by mass/4.0 to 14.0% by mass are mixed is used as the refrigerant in the low-temperature-side refrigeration circuit. The added amount of hexafluoroethane (R116) is high to be non-combustible; the GWP is as small as about 8000; and a low temperature lower than −80° C. can be achieved. Furthermore, a further effect in which the COP does not decrease, oil deterioration and sludge do not occur, and a risk of explosion is not caused is more surely exerted. When the formulated amounts of difluoroethylene (R1132a)/hexafluoroethane (R116)/carbon dioxide (R744) fall within the ranges of 27.6 to 29.2% by mass/56.8 to 68.4% by mass/4.0 to 14.0% by mass respectively, preferably when difluoroethylene (R1132a)/hexafluoroethane (R116)/carbon dioxide (R744)=28.1/67.0/4.9% by mass, the above-described operation and effect can be surely exerted.

The invention according to claim 6 is the binary refrigerating apparatus according to claim 4, wherein a refrigerant composition in which difluoroethylene (R1132a)/hexafluoroethane (R116)/carbon dioxide (R744)=54.8 to 58.3% by mass/25.2 to 35.7% by mass/8.0 to 18.0% by mass are mixed is used as the refrigerant in the low-temperature-side refrigeration circuit.

Although the added amount of hexafluoroethane (R116) is low to be slightly combustible, the GWP is as extraordinarily small as about 3800, and a low temperature lower than −80° C. can be achieved. Furthermore, a further effect in which the COP does not decrease, oil deterioration and sludge do not occur, and a risk of explosion is not caused is more surely exerted. When difluoroethylene (R1132a)/hexafluoroethane (R116)/carbon dioxide (R744)=54.8 to 58.3% by mass/25.2 to 35.7% by mass/8.0 to 18.0% by mass, as a preferred example, when difluoroethylene (R1132a)/hexafluoroethane (R116)/carbon dioxide (R744)= 55.4/30.5/14.0% by mass, the above-described operation and effect can be surely exerted.

The invention according to claim 7 is the binary refrigerating apparatus according to any one of claims 1 to 6, wherein a refrigerant composition, in which n-pentane is mixed in a ratio of 14% by mass or less with respect to the total mass of the refrigerant composition in the low-temperature-side refrigeration circuit, is used. When n-pentane is mixed in a ratio of 14% by mass or less with respect to the total mass of the non-azeotropic mixture, n-pentane effectively acts as an oil carrier even within an extremely low temperature range, and thus plays a role of clearing clogging due to oil. Furthermore, since the added amount of n-pentane is as small as 14% by mass or less, a further effect in which a risk of explosion is not caused is exerted.

The invention according to claim 8 is the binary refrigerating apparatus according to any one of claims 1 to 6, wherein a refrigerant composition, in which propane (R290) is mixed in a ratio of 14% by mass or less with respect to the total mass of the refrigerant composition in the low-temperature-side refrigeration circuit, is used. When propane is mixed in a ratio of 14% by mass or less with respect to the total mass of the refrigerant composition, propane also acts as an oil carrier in a similar manner to the above-described n-pentane. Furthermore, since the added amount of propane is as small as 14% by mass or less, a further effect in which a risk of explosion is not caused is exerted.

The invention according to claim 9 is the binary refrigerating apparatus according to any one of claims 1 to 8, wherein a refrigerant composition containing a non-azeotropic mixture comprising the refrigerant group of difluoromethane (R32), pentafluoroethane (R125), 1,1,1,2-tetrafluoroethane (R134a) and 1,1,3-trifluoroethane (R143a), and 1,1,1,2,3-pentafluoropentene (HFO-1234ze), and having a Global-warming potential (GWP) of 1500 or less, is used as a refrigerant in the high-temperature-side refrigeration circuit. The binary refrigerating apparatus exerts a further significant effect in which the GWP is as small as 1500 or less to be earth friendly, the outlet pressure and the outlet temperature are inhibited from increasing, the COP does not decrease, oil deterioration and sludge do not occur, and a risk of explosion is not caused.

The invention according to claim 10 is the binary refrigerating apparatus according to any one of claims 1 to 8, wherein a refrigerant composition containing a non-azeotropic mixture comprising the refrigerant group of difluoromethane (R32), pentafluoroethane (R125), 1,1,1,2-tetrafluoroethane (R134a) and 1,1,3-trifluoroethane (R143a), and 1,1,1,2-tetrafluoropentene (HFO-1234yf), and having a Global-warming potential (GWP) of 1500 or less, is used as the refrigerant in the high-temperature-side refrigeration circuit. The binary refrigerating apparatus exerts a further significant effect in which even the use of HFO-1234yf instead of HFO-1234ze can have the same operation and effect as those in the refrigerant composition including HFO-1234ze.

BRIEF DESCRIPTION OF THE DRAWING

FIG. 1 is a refrigerant circuit diagram of a binary refrigerating apparatus in which refrigerant compositions of the present invention are filled.

DESCRIPTION OF EMBODIMENTS

Hereinafter, an embodiment of the present invention will be described in detail on the basis of the drawing.

FIG. 1 is a refrigerant circuit diagram of a binary refrigerating apparatus in which refrigerant compositions of the present invention are filled. "S1" indicates a high-temperature-side refrigerant cycle, and "S2" indicates a low-temperature-side refrigerant cycle.

An outlet-side pipe 2 of a compressor 1 constituting the high-temperature-side refrigerant cycle S1 is connected to an auxiliary condenser 3. The auxiliary condenser 3 is connected to a cascade condenser 11 via an oil cooler 4 of the compressor 1, an auxiliary condenser 5, an oil cooler 7 of a compressor 6 constituting the low-temperature-side refrigerant cycle S2, a condenser 8, a dryer 9, and a capillary tube 10, and is connected to the compressor 1 via a liquid receiver 12 through an inlet-side pipe 13. Numeral "14" is a cooling fan for the condensers 3, 5 and 8.

An outlet-side pipe 15 of the compressor 6 in the low-temperature-side refrigerant cycle S2 is connected to an oil separator 16, and a compressor oil separated in the oil separator 16 is returned to the compressor 6 through a return pipe 17. On the other hand, a refrigerant flows into a pipe 18 and exchanges heat with an inlet-side heat exchanger 19, and thereafter passes through a pipe 20 within the cascade condenser 11 to condense. Then, the refrigerant flows into an evaporator 24 from an entrance pipe 23 via a dryer 21 and a capillary tube 22, and exits through an exit pipe 25 and returns to the compressor 6 from an inlet-side pipe 26 of the compressor 6 via the inlet-side heat exchanger 19. Numeral "27" is an expansion tank connected to the inlet-side pipe 26 via a capillary tube 28.

An HFC refrigerant mixture (GWP value: 1500 or less) containing 1,1,1,2,3-pentafluoropentene (HFO-1234ze) is filled in the high-temperature-side refrigerant cycle S1. This refrigerant mixture, having a boiling point at atmospheric pressure of about −40° C., condenses in the condensers 3, 5 and 8, and decompressed in the capillary tube 10. The decompressed refrigerant mixture flows in the cascade condenser 11 to evaporate. Here, the cascade condenser 11 becomes about −36° C.

A non-azeotropic mixture in which carbon dioxide (R744) is mixed in a ratio of 20% by mass or less to difluoroethylene (R1132a), and n-pentane, are filled in the low-temperature-side refrigerant cycle S2. Here, n-pentane is mixed in a ratio of 14% by mass or less with respect to the total mass of the non-azeotropic mixture. As a result, a refrigerant composition having a considerably low evaporation temperature of about −90° C. comes to be filled. Then, the refrigerant and compressor oil discharged from the compressor 6 flow into the oil separator 16. In the oil separator 16, the refrigerant and oil are separated into a gas phase and a liquid phase through a filter. A large portion of the oil is in a liquid phase, and thus can return to the compressor 6 through the return pipe 17. The refrigerant and oil in a gas phase pass through the pipe 18 and exchange heat with the inlet-side heat exchanger 19, and furthermore, are cooled in the cascade condenser 11 due to evaporation of the refrigerant within the high-temperature-side refrigerant cycle S1 to condense. Thereafter, the refrigerant and oil are decompressed in the capillary tube 22, and flow into the evaporator 24 to evaporate. This evaporator 24 is disposed on a wall of a freezer, which is not shown, in a heat exchange relationship for cooling the inside of the freezer. Here, the evaporation temperature in the evaporator 24 reaches about −90° C.

In the binary refrigerating apparatus configured in this manner, a non-azeotropic mixture in which 20% by mass or less of carbon dioxide (R744) is mixed to difluoroethylene (R1132a), which is a refrigerant composition to be filled in the low-temperature-side refrigerant cycle S2, has an evaporation temperature of about −90° C. Therefore, this non-azeotropic mixture can sufficiently exert refrigerating capacity as an alternative refrigerant to R508A.

Furthermore, although the non-azeotropic mixture in which carbon dioxide (R744) is mixed in a ratio of 20% by mass or less to difluoroethylene (R1132a) has poor compatibility with oil, this can be solved by mixing 14% by mass or less of n-pentane. That is, n-pentane has a high boiling point of +36.07° C., but has good compatibility with a compressor oil. Accordingly, when n-pentane is mixed in a range of 14% by mass or less, the oil can be returned to a compressor in a state of blending in n-pentane. This can prevent a harmful effect such as locking due to oil loss in a compressor. As a result, the oil can be returned to the compressor 6 without necessity of thoroughly separating the oil in the oil separator 16. Here, since n-pentane has a high boiling point, addition of n-pentane in an extremely large amount increases an evaporation temperature thereby failing to obtain an intended low temperature. However, when n-pentane is added in a ratio of 14% by mass or less, the evaporation temperature does not increase, and n-pentane enables the oil to return to a compressor while being maintained in a non-combustible range.

Thus, according to the binary refrigerating apparatus of the present example, oil return improves, hazards such as explosion are not caused, and a low temperature of about −90° C. can be achieved in an evaporator. The binary refrigerating apparatus can be practically realized as a medial freezer such as a blood cooler without using regulated refrigerants.

Furthermore, n-pentane is commercially available and can be easily obtained when used in freezers or the like, and is therefore practical.

Furthermore, propane has an advantage in that it can enhance sealing workability and serviceability in a gas state.

It is noted that although the mixture of the non-azeotropic mixture in which 20% by mass or less of carbon dioxide (R744) is mixed to difluoroethylene (R1132a), and n-pentane, has been described in the present embodiment, the use of R290 (propane, $C_3H_8$) in the same ratio in place of n-pentane can achieve a similar effect. That is, propane also has good compatibility with a compressor oil. Accordingly, when propane is mixed in an amount of 14% by mass or less, the oil can be returned to the compressor 6 in a state of being dissolved in propane. This can inhibit a harmful effect such as locking due to oil loss in the compressor 6. Here, although propane has a low boiling point of −42.75° C. and thus less influence on the evaporation temperature, it is combustible and has a risk of explosion, causing a problem in handling. However, when propane is contained in an amount of 14% by weight or less, propane can be maintained in a non-combustible range. This eliminates concerns such as explosion.

It is noted that the embodiment described above is for explaining the present invention, and neither limits nor narrows the invention described in the claims. Configurations of the components of the present invention are not limited to the embodiment described above, and can be variously modified within the technical scope described in the claims.

EXAMPLES

Although the present invention will be described below with reference to examples, the present invention is not limited to these examples as long as the gist of the present invention is not departed.

Example 1

A binary refrigerating apparatus illustrated in FIG. 1 was stably and continuously operated at an outside air temperature of −10° C. for a long time. Thereafter, a cycle S1 and a cycle S2 were measured for temperatures at the points described below.

In the high-temperature-side refrigerant cycle S1, a refrigerant composition (GWP value: 1500 or less, boiling point: about −40° C. at atmospheric pressure) containing a non-azeotropic mixture comprising the refrigerant group of difluoromethane (R32), pentafluoroethane (R125), 1,1,1,2-tetrafluoroethane (R134a) and 1,1,3-trifluoroethane (R143a), and 1,1,1,2,3-pentafluoropentene (HFO-1234ze), was filled.

This refrigerant mixture condensed in each of condensers 3,5 and 8, was decompressed in a capillary tube 10, and flowed into a cascade condenser 11 to evaporate. The temperature at an exit of the cascade condenser 11 was −54.9° C.

On the other hand, in the low-temperature-side refrigerant cycle S2, a refrigerant composition (GWP value: about 8000), in which n-pentane was added as an oil carrier in an amount of 6.8% by mass with respect to the whole to a non-combustible refrigerant composition including difluoroethylene (R1132a)/hexafluoroethane (R116)/carbon dioxide (R744)=28.1/67.0/4.9% by mass, was filled.

The temperature of an outlet-side pipe 15 at a refrigerant exit of the compressor 6 in the low-temperature-side refrigerant cycle S2 was 45.4° C.; the temperature of an inlet-side pipe 26 at a refrigerant inlet to the compressor 6 was −15.8° C.; the temperature of an entrance pipe 23 to an evaporator 24 was −97.2° C.; the temperature of an exit pipe 25 from the evaporator 24 was −90.3° C.; and the temperature inside a freezer (not shown) was −95.3° C.

Example 2

In the high-temperature-side refrigerant cycle S1 and the low-temperature-side refrigerant cycle S2, the same refrigerant compositions as those in Example 1 were filled. Then, the binary refrigerating apparatus illustrated in FIG. 1 was stably and continuously operated at an outside air temperature of 31.1° C. for a long time. Thereafter, the cycle S1 and the cycle S2 were measured for temperatures at the points described below.

The temperature at an exit of the cascade condenser 11 was −35.9° C.

The temperature of the outlet-side pipe 15 at the refrigerant exit of the compressor 6 in the low-temperature-side refrigerant cycle S2 was 79.0° C.; the temperature of the inlet-side pipe 26 at the refrigerant inlet to the compressor 6 was 7.6° C.; the temperature of the entrance pipe 23 to the evaporator 24 was −90.2° C.; the temperature of the exit pipe 25 from the evaporator 24 was −81.8° C.; and the temperature inside the freezer (not shown) was −87.6° C.

Also, a refrigerant composition including R1132a/R116/R744=27.6 to 29.2% by mass/56.8 to 68.4% by mass/4.0 to 14.0% by mass, as a refrigerant composition belonging to A1 class (non-combustible) in the same manner as the above-described low-temperature-side refrigerant composition, similarly had good results.

Example 3

The binary refrigerating apparatus illustrated in FIG. 1 was stably and continuously operated at an outside air temperature of −0.4° C. for a long time. Thereafter, the cycle S1 and the cycle S2 were measured for temperatures at the points described above.

In the high-temperature-side refrigerant cycle S1, a refrigerant composition (GWP value: 1500 or less, boiling point: about −40° C. at atmospheric pressure) containing a non-azeotropic mixture comprising the refrigerant group of difluoromethane (R32), pentafluoroethane (R125), 1,1,1,2-tetrafluoroethane (R134a) and 1,1,3-trifluoroethane (R143a), and 1,1,1,2,3-pentafluoropentene (HFO-1234ze), was filled.

This refrigerant mixture condensed in each of the condensers 3,5 and 8, was decompressed in the capillary tube 10, and flowed into the cascade condenser 11 to evaporate. The temperature at the exit of the cascade condenser 11 was −53.1° C.

On the other hand, in the low-temperature-side refrigerant cycle S2, a refrigerant composition (GWP value: about 3800), in which n-pentane was further added as an oil carrier in an amount of 7.1% by mass with respect to the whole to a slightly combustible refrigerant composition including difluoroethylene (R1132a)/hexafluoroethane (R116)/carbon dioxide (R744)=55.4/30.5/14.1% by mass, was filled.

The temperature of the outlet-side pipe 15 at the refrigerant exit of the compressor 6 in the low-temperature-side refrigerant cycle S2 was 46.4° C.; the temperature of the inlet-side pipe 26 at the refrigerant inlet to the compressor 6 was −14.6° C.; the temperature of the entrance pipe 23 to the evaporator 24 was −90.0° C.; the temperature of the exit pipe 25 from the evaporator 24 was −83.5° C.; and the temperature inside the freezer (not shown) was −95.5° C.

Example 4

In the high-temperature-side refrigerant cycle S1 and the low-temperature-side refrigerant cycle S2, the same refrigerant compositions as those in Example 3 were filled. Then, the binary refrigerating apparatus illustrated in FIG. 1 was stably and continuously operated at an outside air temperature of 29.7° C. for a long time. Thereafter, the cycle S1 and the cycle S2 were measured for temperatures at the points described below.

The temperature at the exit of the cascade condenser 11 was −36.4° C.

The temperature of the outlet-side pipe 15 at the refrigerant exit of the compressor 6 in the low-temperature-side refrigerant cycle S2 was 79.0° C.; the temperature of the inlet-side pipe 26 at the refrigerant inlet to the compressor 6 was 7.2° C.; the temperature of the entrance pipe 23 to the evaporator 24 was −90.6° C.; the temperature of the exit pipe 25 from the evaporator 24 was −90.5° C.; and the temperature inside the freezer (not shown) was −89.9° C.

Also, a refrigerant composition, including R1132a/R116/R744=54.8 to 58.3% by mass/25.2 to 35.7% by mass/8.0 to 18.0% by mass as a refrigerant composition belonging to A2L class (slightly combustible) in the same manner as the above-described low-temperature-side refrigerant composition, similarly had good results.

Thus, as indicated in Examples 1 to 4, sufficiently low temperature was obtained inside the freezer with a refrigerant composition having a small GWP, and operation was performed without reduction in COP, occurrence of oil deterioration and sludge, and a risk of explosion.

INDUSTRIAL APPLICABILITY

The binary refrigerating apparatus according to the present invention includes a high-temperature-side refrigeration circuit and a low-temperature-side refrigeration circuit, wherein a refrigerant in the low-temperature-side refrigeration circuit is condensed by a refrigerant passing through a cascade condenser in the high-temperature-side refrigeration circuit. As the refrigerant in the low-temperature-side refrigeration circuit, a refrigerant composition containing difluoroethylene (R1132a) is used. Since difluoroethylene (R1132a) has a mall GWP of 10 and a low boiling point of −85.7° C., the refrigerant composition has a small GWP to be earth friendly, and can achieve a low temperature of −80° C. The binary refrigerating apparatus according to the present invention exerts a significant effect in which the COP does not decrease, oil deterioration and sludge do not occur, and a risk of explosion is not caused.

Furthermore, as the refrigerant in the low-temperature-side refrigeration circuit, a refrigerant composition in which 20% by mass or less of carbon dioxide (R744) is mixed to difluoroethylene (R1132a) is used. In this case, since carbon dioxide (R744) has a GWP of 1, the refrigerant composition has a small GWP to be earth friendly, and can achieve a low temperature of −80° C. Furthermore, when the added amount of carbon dioxide (R744) is 20% by mass or less, the outlet pressure and the outlet temperature are inhibited from increasing. Therefore, a further significant effect in which the COP does not decrease, oil deterioration and sludge do not occur, and a risk of explosion is not caused is exerted.

Also, although the addition of R116 for the purpose of obtaining a non-combustible refrigerant mixture as the low-temperature-side refrigerant increases the GWP, a further significant effect in which an advantage of becoming non-combustible is significantly expressed is exerted.

The binary refrigerating apparatus according to the present invention exerts a significant effect in which it has a smaller GWP than R508A as a known refrigerant to be earth friendly; the COP is high; oil deterioration and sludge do not occur; n-pentane or propane is used in a small amount as an oil carrier and thus can return an oil which cannot be separated in an oil separator to a compressor; a risk of explosion is not caused; a low temperature of −80° C. can be achieved; and excellent performance is exerted in terms of refrigerating capacity and other performance. Therefore, the binary refrigerating apparatus is highly industrially applicable.

REFERENCE SIGNS LIST

S1 high-temperature-side refrigerant cycle
S2 low-temperature-side refrigerant cycle
1, 6 compressor
cascade condenser
evaporator

The invention claimed is:
1. A binary refrigerating apparatus comprising:
a high-temperature-side refrigeration circuit; and
a low-temperature-side refrigeration circuit that achieves a refrigerating capacity of −80° C. or lower by condensing a refrigerant in the low-temperature-side refrigeration circuit with a refrigerant passing through a cascade condenser in the high-temperature-side refrigeration circuit,
wherein the refrigerant in the low-temperature-side refrigeration circuit contains a first amount of difluoroethylene (R1132a) and a second amount of hexafluoroethane (R116), and
wherein the first amount of difluoroethylene (R1132a) and the second amount of hexafluoroethane (R116) contained in the refrigerant allow an evaporation temperature of the refrigerant in the low-temperature-side refrigeration circuit to be lower than a boiling point of difluoroethylene (R1132a) and a boiling point of hexafluoroethane (R116).

2. A binary refrigerating apparatus comprising:
a high-temperature-side refrigeration circuit; and
a low-temperature-side refrigeration circuit that achieves a refrigerating capacity of −80° C. or lower by condensing a refrigerant in the low-temperature-side refrigeration circuit with a refrigerant passing through a cascade condenser in the high-temperature-side refrigeration circuit,
wherein the refrigerant in the low-temperature-side refrigeration circuit contains a first amount of difluoroethylene (R1132a) and more than 0% by mass and 20% by mass or less of carbon dioxide (R744), and
wherein the first amount of difluoroethylene (R1132a) and more than 0% by mass and 20% by mass or less of carbon dioxide (R744) contained in the refrigerant allow an evaporation temperature of the refrigerant in the low-temperature-side refrigeration circuit to be lower than a boiling point of difluoroethylene (R1132a) and a boiling point of carbon dioxide (R744).

3. The binary refrigerating apparatus according to claim 1, wherein the refrigerant in the low-temperature-side refrigeration circuit further contains a third amount of carbon dioxide (R744), and
wherein the first amount of difluoroethylene (R1132a), the second amount of hexafluoroethane (R116), and the third amount of carbon dioxide contained in the refrigerant allow the evaporation temperature of the refrigerant in the low-temperature-side refrigeration circuit to be lower than any boiling points of difluoroethylene (R1132a), hexafluoroethane (R116), and carbon dioxide (R744).

4. The binary refrigerating apparatus according to claim 2, wherein the refrigerant in the low-temperature-side refrigeration circuit further contains hexafluoroethane (R116).

5. The binary refrigerating apparatus according to claim 4, wherein the refrigerant in the low-temperature-side refrigeration circuit contains which difluoroethylene (R1132a)/hexafluoroethane (R116)/carbon dioxide (R744)=27.6 to 29.2% by mass/56.8 to 68.4% by mass/4.0 to 14.0% by mass to allow the evaporation temperature of the refrigerant in the low-temperature-side refrigeration circuit to be lower than any of the boiling point of difluoroethylene (R1132a), a boiling point of hexafluoroethane (R116), and the boiling point of carbon dioxide (R744).

6. The binary refrigerating apparatus according to claim 4, wherein the refrigerant in the low-temperature-side refrigeration circuit contains difluoroethylene (R1132a)/hexafluoroethane (R116)/carbon dioxide (R744)=54.8 to 58.3% by mass/25.2 to 35.7% by mass/8.0 to 18.0% by mass to allow the evaporation temperature of the refrigerant in the low-temperature-side refrigeration circuit to be lower than any of the boiling point of difluoroethylene (R1132a), a boiling point of hexafluoroethane (R116), and the boiling point of carbon dioxide (R744).

7. The binary refrigerating apparatus according to claim 1, wherein the refrigerant in the low-temperature-side refrigeration circuit contains a ratio of 14% by mass or less of n-pentane with respect to a total mass of the refrigerant in the low-temperature-side refrigeration circuit.

8. The binary refrigerating apparatus according to claim 1, wherein the refrigerant in the low-temperature-side refrigeration circuit contains a ratio of 14% by mass or less of propane (R290) with respect to a total mass of the refrigerant in the low-temperature-side refrigeration circuit.

9. The binary refrigerating apparatus according to claim 1, wherein the refrigerant in the low-temperature-side refrigeration circuit contains a non-azeotropic mixture comprising a refrigerant group of difluoromethane (R32), pentafluoroethane (R125), 1,1,1,2-tetrafluoroethane (R134a), and 1,1,3-trifluoroethane (R143a), and 1,1,1,2,3-pentafluoropentene (HFO-1234ze), and having a Global-warming potential (GWP) of 1500 or less.

10. The binary refrigerating apparatus according to claim 1, wherein the refrigerant in the low-temperature-side refrigeration circuit contains a non-azeotropic mixture comprising a refrigerant group of difluoromethane (R32), pentafluoroethane (R125), 1,1,1,2-tetrafluoroethane (R134a), and 1,1,3-trifluoroethane (R143a), and 1,1,1,2-tetrafluoropentene (HFO-1234yf), and having a Global-warming potential (GWP) of 1500 or less.

11. The binary refrigerating apparatus according to claim 2, wherein the refrigerant in the low-temperature-side refrigeration circuit contains n-pentane that is mixed in a ratio of 14% by mass or less with respect to a total mass of the refrigerant in the low-temperature-side refrigeration circuit.

12. The binary refrigerating apparatus according to claim 2, wherein the refrigerant in the low-temperature-side refrigeration circuit contains a ratio of 14% by mass or less of propane (R290) with respect to a total mass of the refrigerant in the low-temperature-side refrigeration circuit.

13. The binary refrigerating apparatus according to claim 2, wherein the refrigerant in the low-temperature-side refrigeration circuit contains a non-azeotropic mixture comprising a refrigerant group of difluoromethane (R32), pentafluoroethane (R125), 1,1,1,2-tetrafluoroethane (R134a), and 1,1,3-trifluoroethane (R143a), and 1,1,1,2,3-pentafluoropentene (HFO-1234ze), and having a Global-warming potential (GWP) of 1500 or less.

14. The binary refrigerating apparatus according to claim 2, wherein the refrigerant in the low-temperature-side refrigeration circuit contains a non-azeotropic mixture comprising a refrigerant group of difluoromethane (R32), pentafluoroethane (R125), 1,1,1,2-tetrafluoroethane (R134a), and 1,1,3-trifluoroethane (R143a), and 1,1,1,2-tetrafluoropentene (HFO-1234yf), and having a Global-warming potential (GWP) of 1500 or less.

15. The binary refrigerating apparatus according to claim 2, wherein the low-temperature-side refrigeration circuit comprises an evaporator having an entrance pipe for the refrigerant, and a temperature of the entrance pipe to the evaporator is about −90.0 C° in operation.

* * * * *